No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)
(No Model.) 9 Sheets—Sheet 1.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)
(No Model.) 9 Sheets—Sheet 2.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)
(No Model.) 9 Sheets—Sheet 4.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)

(No Model.) 9 Sheets—Sheet 5.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)

(No Model.) 9 Sheets—Sheet 6.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)
(No Model.) 9 Sheets—Sheet 7.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)
(No Model.) 9 Sheets—Sheet 8.

No. 663,731. Patented Dec. 11, 1900.
T. & W. L. COLE.
APPARATUS FOR PRODUCING COLD AIR FOR REFRIGERATING OR LIKE PURPOSES.
(Application filed July 9, 1900.)
(No Model.) 9 Sheets—Sheet 9.

UNITED STATES PATENT OFFICE.

THOMAS COLE AND WILLIAM LAWES COLE, OF LONDON, ENGLAND.

APPARATUS FOR PRODUCING COLD AIR FOR REFRIGERATING OR LIKE PURPOSES.

SPECIFICATION forming part of Letters Patent No. 663,731, dated December 11, 1900.

Application filed July 9, 1900. Serial No. 23,019. (No model.)

*To all whom it may concern:*

Be it known that we, THOMAS COLE and WILLIAM LAWES COLE, subjects of the Queen of Great Britain, residing at St. Ann's Road, Burdett Road, Bow, London, England, have invented certain new and useful Improvements in Apparatus for Producing Cold Air for Refrigerating or Like Purposes, of which the following is a specification.
This invention relates to certain improvements connected with apparatus for producing cold air for refrigerating and like purposes.

Our invention will be clearly understood from the following description, aided by the accompanying drawings, in which several examples of carrying our invention into practice are shown.

Fig. 16 is a plan,
Fig. 18 is a partial elevation, and Fig. 19 a section, of the valve-box, showing the valves in position.

For the purpose of this invention we pass the compressed air from the compression-cylinder A through a chamber or column in which spheres or other obstructive media are placed, over which a current or spray of water is passed to break the inflowing air into fine streams for the purpose of extracting the heat of compression and a portion of the moisture and then to flow through tubes arranged in the same or a separate chamber, so that a further portion of the moisture is removed before it enters the jacketed or expansion cylinder B.

Figure 1:
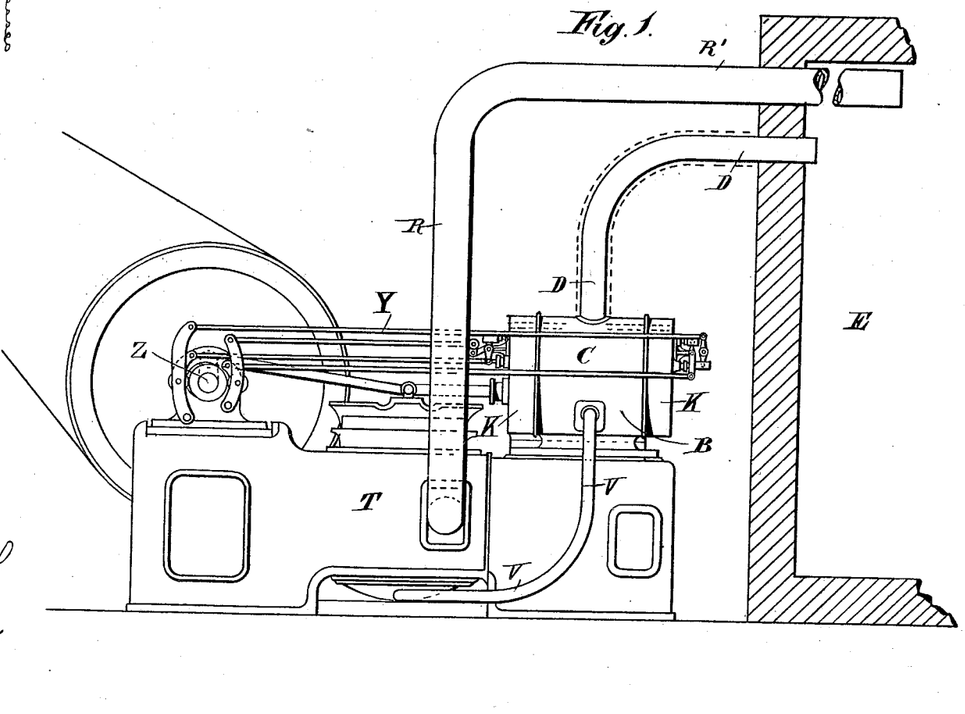
Figure 1 is a side elevation of a complete apparatus, showing the connection by pipes with a refrigerating-chamber.
Figure 2:
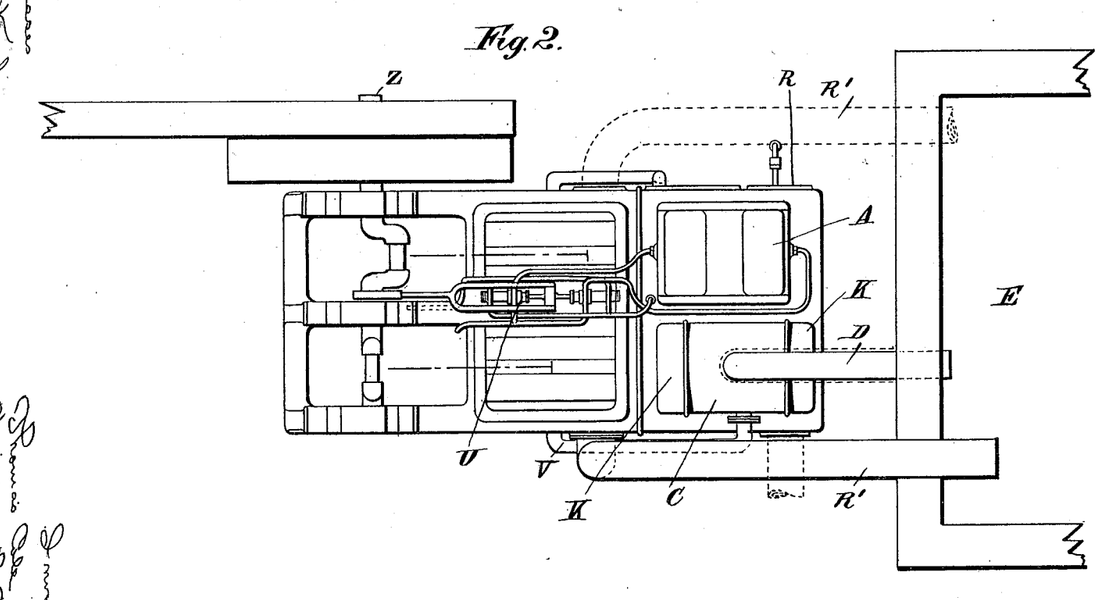
Fig. 2 is a plan of Fig. 1 with the valve-rods removed for the sake of clearness.

The expansion-cylinder B, as before stated, is jacketed or double-cased, and this jacket or casing C in addition to encircling the cylinder may also inclose a portion of or the whole of the pipe or pipes D, as shown in dotted lines at Figs. 1 and 2, which conduct the cold air from the expansion-cylinder B to the refrigerating-chamber E, or the pipe D may be arranged from each end of the cylinder and conducted outside thereof to a junction D', when by a pipe D² the air can be led to the refrigerating-chamber.

Figure 4:
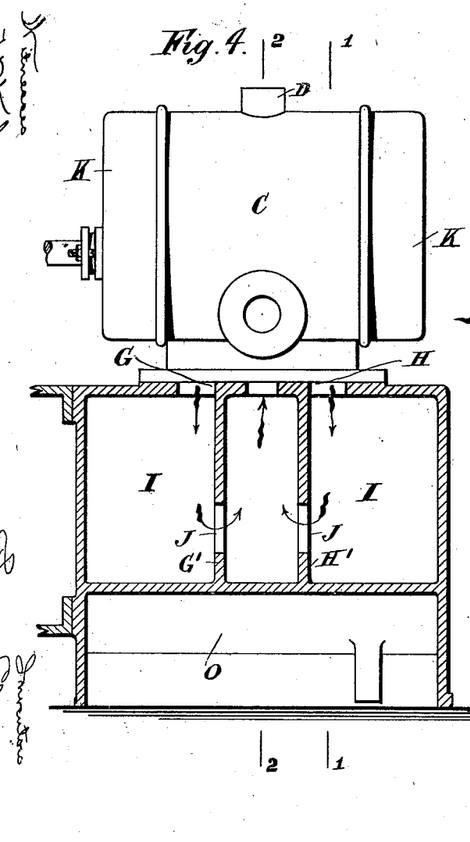
Fig. 4 is an elevation of the expansion-cylinder horizontally arranged, with its supporting box or casing in section, the compressed air first passing around the end portions of the cylinder and then around the center.
Figure 5:
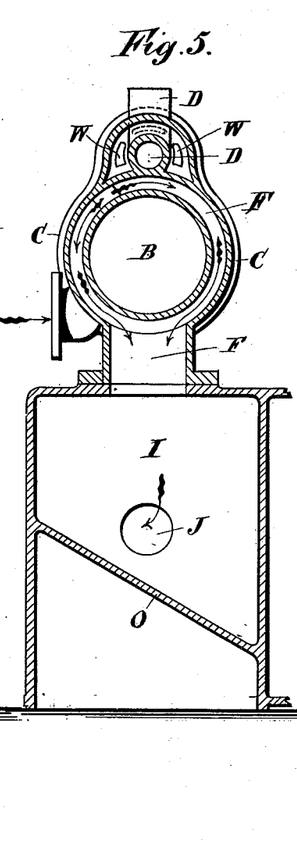
Fig. 5 is a section on the line 1 1 of Fig. 4.
Figure 6:
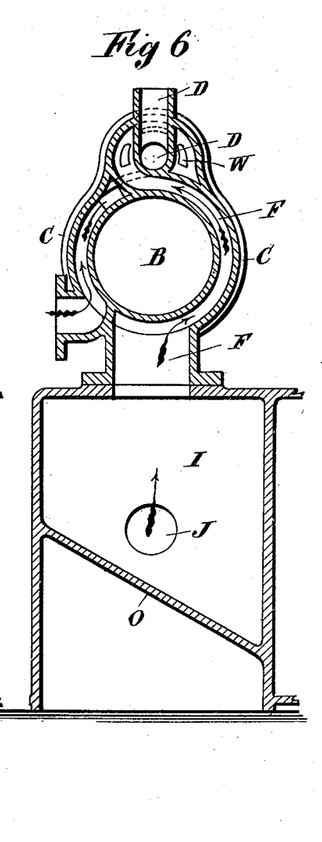
Fig. 6 is a section on the line 2 2 of Fig. 4.
Figure 7:
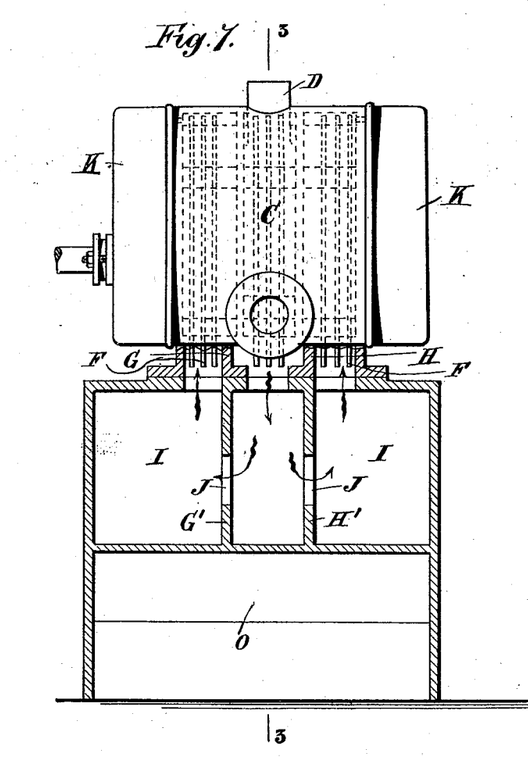
Fig. 7 is an elevation of the expansion-cylinder horizontally arranged, with its supporting box or casing in section, the compressed air first passing around the center portion of the cylinder and then the outer or end part.
Figure 8:
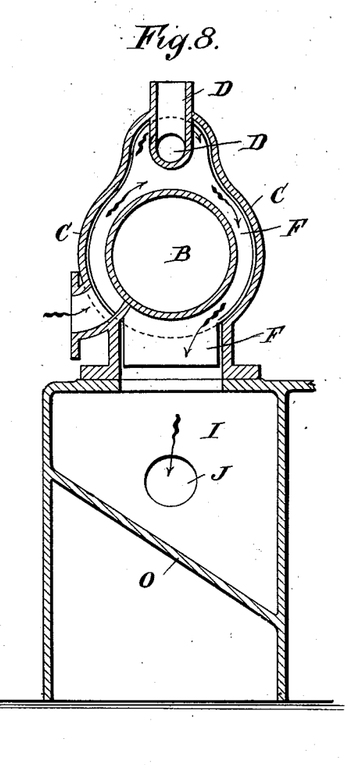
Fig. 8 is a section through the line 3 3 of Fig. 7.
Figure 9:
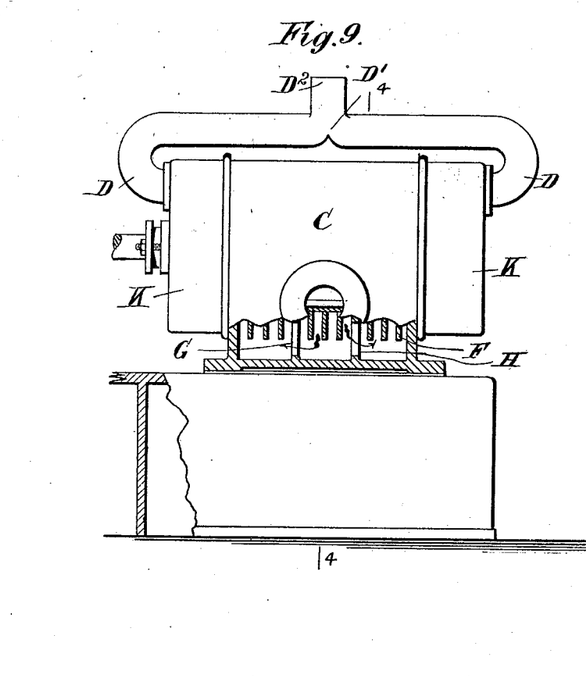
Fig. 9 is a part-sectional elevation of a horizontally-arranged expansion-cylinder in which the compressed air only passes around the cylinder and not also through the boxes or supports, as in Figs. 4 to 8.
Figure 10:
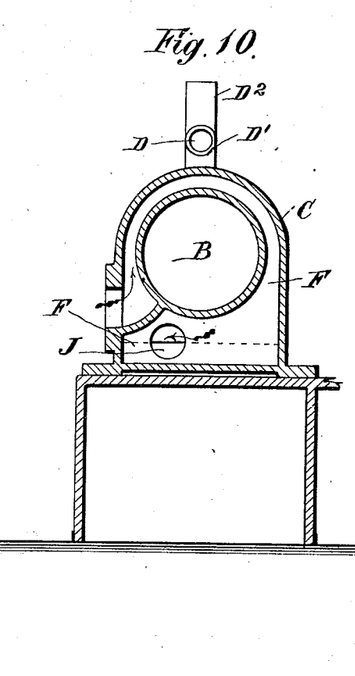
Fig. 10 is a section through line 4 4, Fig. 9.

The outer wall of the expansion-cylinder B is provided with webs, ribs, fins, or other like projections F in ring or other form for creating a greater surface for contact of the compressed air to better extract any remaining moisture and render the air more efficient in its action, the space between the expansion-cylinder B and its jacket C being divided at various parts, as at G H, so that air in entering between the cylinder B and jacket C will diverge and pass completely, or nearly so, around the cylinder B at about its ends and then pass down into the lower portion or into a box or casing I, in which the cylinder B C is part of or may be supported, as at Figs. 4 and 7, division-plates G' H' being also provided, so that the air can pass through holes J in or under the division-plates G' H' and ascend and pass around the center portion of the expansion-cylinder and may also pass around the whole or a portion of the outlet pipe or pipes D before reaching the jacketed valve-chests K, arranged in the end or ends of the cylinder for passing through the valve or valves L M into the cylinder B and be then expanded and afterward forced into the refrigerating-chamber.

Figure 3:
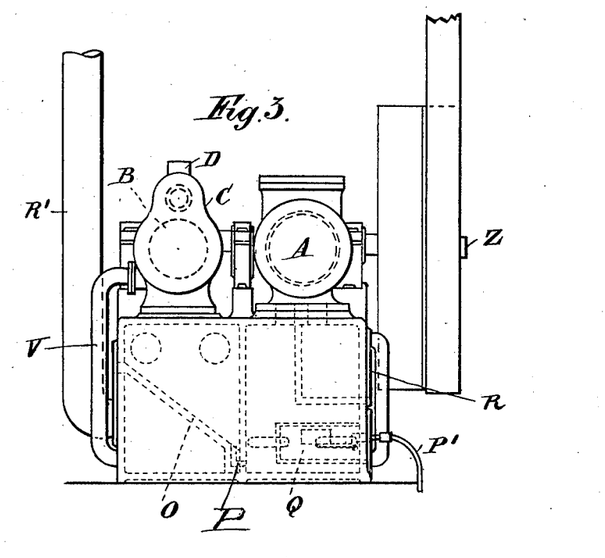
Fig. 3 is an end view of the apparatus.

The box or casing or receiver-chamber I, upon which the expansion-cylinder may be supported or is part of, may have a sloping bottom O, provided with an outlet P, Fig. 3, so that all water extracted from the air by contact with the projections F of the cylinder B or casing C can be passed into the automatic water-trap Q on the machine, a water seal only being necessary to prevent the air passing with the water, the water eventually passing away by the pipe P'. By thus constructing the expansion-cylinder B all moisture must trickle down from the cylinder-casing B C into the lower part or into the box or support I, and by its removal greater dryness and efficiency of the air are insured.

The travel of the air around the cylinder B may be in a way other than that above described, and should the cylinder be arranged vertically or anglewise the projections F and dividing-plates G H will be arranged accordingly to automatically drain away the water deposited from the air to a convenient place for drainage.

The box or casing I, forming part of or supporting the cylinder, may be part of the base or bed for supporting the whole of the air-cooling apparatus, thus insuring compactness.

Figure 15:
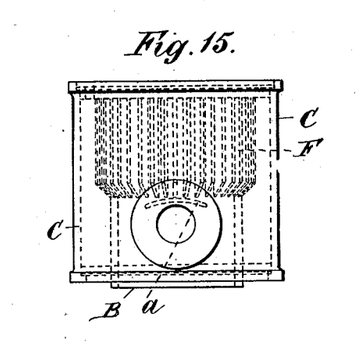
Fig. 15 is an elevation of a vertically-arranged expansion-cylinder for single-acting machines.
Figure 16:
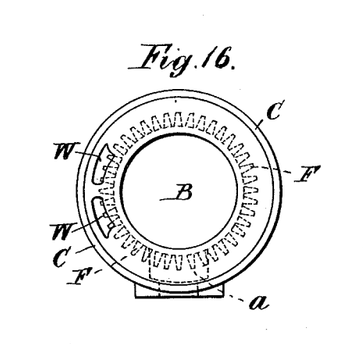
Figure 17:
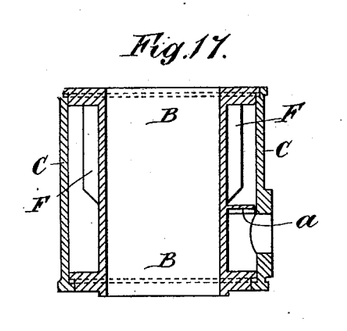
Fig. 17 is a section, in all of which the ribs or plates are only arranged for part of the length of the cylinder, the air entering under a baffle for distribution around the other part of the cylinder to pass between the ribs in one direction only for a single-acting expansion-cylinder.
Figure 18:
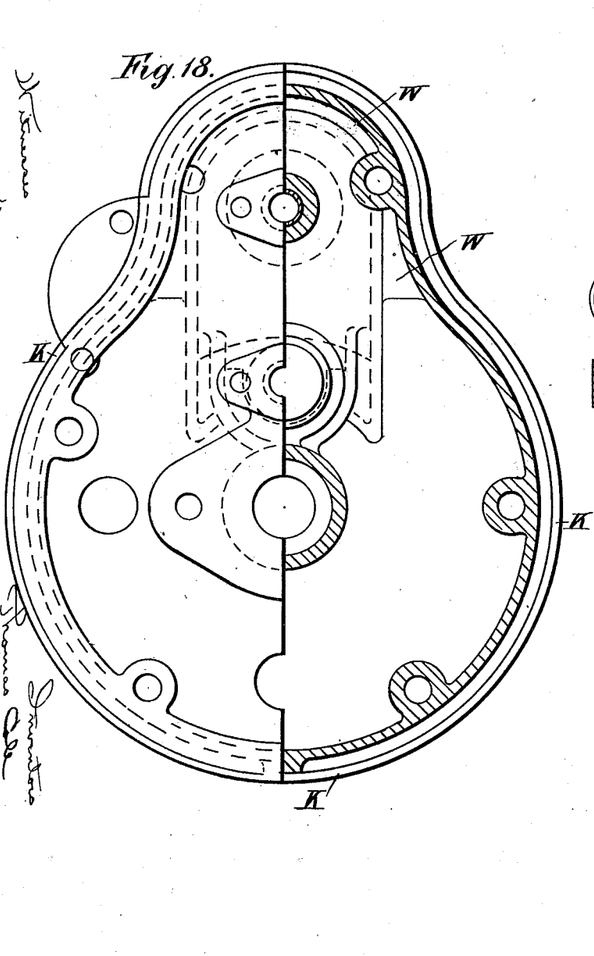
Figure 19:
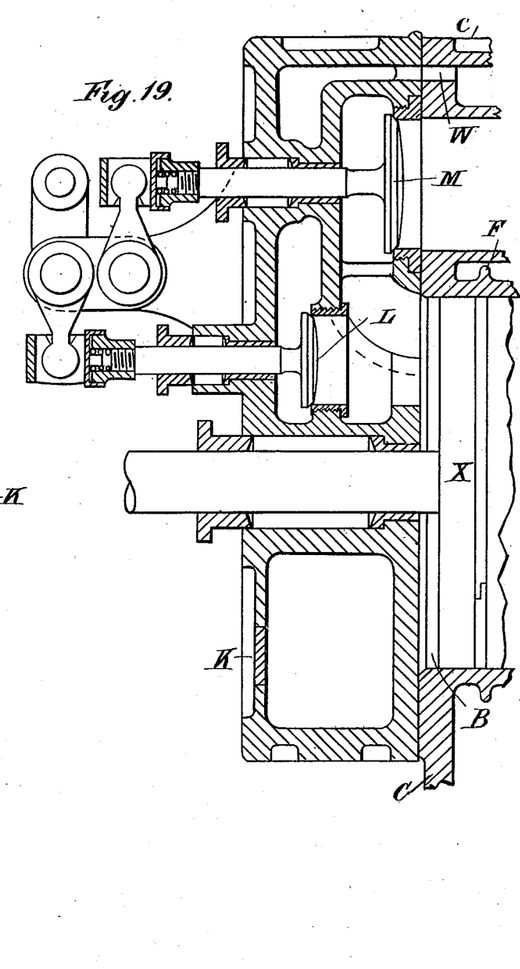

In some cases the cylinder B and its appurtenances may be so constructed that the air instead of dividing into two currents at the top of the cylinder may remain as a single current and pass around or along the cylinder between division-plates arranged on each side of the center line of the cylinder, and from whence it passes into the box or casing and thence diverges on either side to repass around the cylinder on the other side of the division-plates to the air-delivery-tube jacket and from thence to jackets of the jacketed valve-chests, as before explained, or the cold dry air may pass direct from the cylinder-casing to the valve-chests, as at Figs. 15, 16, and 17, where the air is first distributed around the cylinder B by a baffle or guard a.

The casing or jacket of the cylinder may be of ⌂ shape, with the flat or larger part of the casing at the bottom, the webs or fins surrounding the cylinder being of the same or equivalent shape and projecting to near the bottom, and the air-outlet pipe may be arranged from the valve chest or chests.

As will be understood, the chief feature of novelty of the invention consists in providing the cylinder B or its casing C with webs or fins arranged in such manner in relation to the position or construction of the expansion-cylinder that the compressed cold air is conducted around or along the cylinder in one or various directions, and at the same time, by reason of the webs or fins affording a greater surface for the attraction of the moisture or water contained in the compressed air, such moisture or water is completely extracted from the compressed air, which enters and leaves the expansion-cylinder in a perfectly dry condition, thus insuring a perfect working of the complete apparatus in consequence of all frost or snow produced by the moisture being uncreated, all blocking of the valves being thereby prevented.

According to the apparatus or plant shown on the annexed drawings, Figs. 1, 2, and 3, the air is drawn into the compression-cylinder A preferably from the opening R, but it may be from the refrigerating-chamber by the pipe R'. The air after compression in the cylinder A is passed into a chamber or column T, in which spheres or other obstructive media are placed and over which a current or spray of water under pressure from a pump U is passed to break the inflowing air into fine streams for the purpose of extracting the heat of compression, the air then flowing through tubes also arranged within the chamber or column T and away to the expansion-cylinder B C by the pipe V, where it traverses the cylinder in the manner before described according to the construction of such cylinder, the traveling cold air entering the valve box or boxes K by the channel or opening W, from which valve-box K the compressed air enters the expansion-cylinder through the valve L, to be expelled on the return motion of the piston X through the valve M for passage by the pipe or pipes D to the refrigerating-chamber E for distribution therein. The valves of the expansion-cylinder are operated by any suitable arrangement of rods Y, actuated by cams or otherwise on the driving crank-shaft Z, which can obtain its motion from any prime mover.

Figure 11:
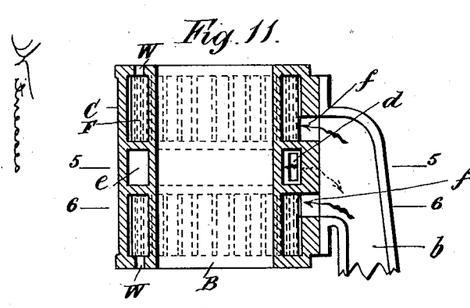
Fig. 11 is a section of a vertically-arranged expansion-cylinder in which the compressed air first passes around the center part of the cylinder and then around the outer end.
Figure 12:
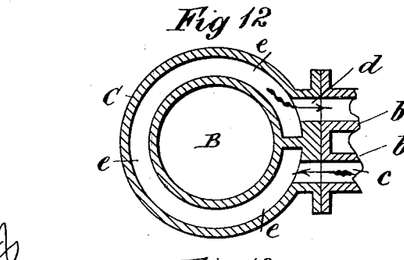
Fig. 12 is a section in lines 5 5, Fig. 11.
Figure 13:
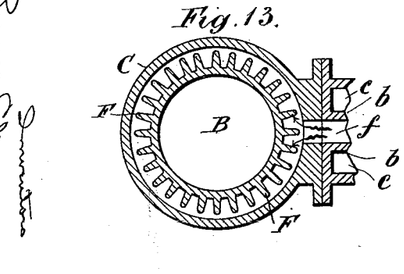
Fig. 13 is a section in lines 6 6, Fig. 11.
Figure 14:
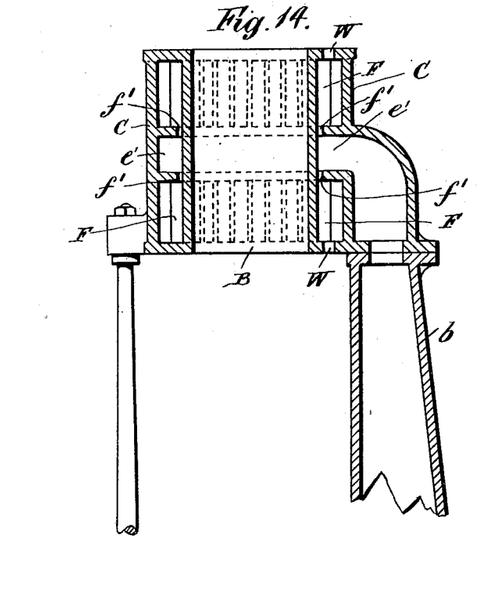
Fig. 14 is a section of a vertically-arranged expansion-cylinder in which the compressed air first passes around the center part and then each end.

According to Figs. 11, 12, and 13 the air is caused to travel from the compressor A or from an intermediate reservoir or chamber up through a partitioned casting b, through the opening c, and around the center compartment e of the cylinder to the port d, from whence it is conducted down the other side of the partition in b to enter the ports f and be conducted by the ribs F to the outlet W to the valve-casing K; but in Fig. 14 the partition in the casting b is dispensed with and the compressed air will travel to the middle compartment e' and away through the openings f' along the ribs to the outlets W.

What we claim, and desire to secure by Letters Patent, is—

1. In an apparatus for producing cold air for refrigerating purposes and the like, an air-compressor, an air-cooling device in communication therewith, a ribbed expansion-cylinder, a casing in communication therewith, a jacket surrounding the same, partitions in said casing for causing the air to travel circuitously around said expansion-cylinder, within said jacket and deposit its moisture upon said ribs, means in said casing for collecting said moisture, a valve mechanism for admitting air to the expansion-cylinder, and connections between the latter and a suitable reservoir.

2. In an apparatus for producing cold air for refrigerating purposes and the like, an air-compressor, an air-cooling device in communication therewith, a casing, a valve mechanism for admitting air to said casing, an expansion-cylinder, a jacket surrounding the same, a moisture-collecting means interposed between said expansion-cylinder and said jacket, partitions in said casing for causing the air to travel around said expansion-cylinder and to deposit its moisture upon said collecting means, a sloping bottom in said casing for receiving said moisture from said means, a valve mechanism for admitting air to said expansion-cylinder, and a reservoir in communication with said expansion-cylinder.

In testimony whereof we have hereunto set our hands in presence of two subscribing witnesses.

THOMAS COLE.
WILLIAM LAWES COLE.

Witnesses:
EDMUND S. SNEWIN,
WM. O. BROWN.